United States Patent
Satoh

[19]

[11] Patent Number: 6,002,537
[45] Date of Patent: *Dec. 14, 1999

[54] ROTARY HEAD REPRODUCING APPARATUS THAT DISPLAYS DATE, TIME, AND FRAME NUMBER EVEN WHEN SUCH DATA CODE INFORMATION IS ABSENT DURING A SEARCH MARKER USING INTERPOLATION BASED ON HEAD SWITCHING PULSE

[75] Inventor: Keiji Satoh, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,251

[22] Filed: Mar. 24, 1997

Related U.S. Application Data

[63] Continuation of application No. 08/425,229, Apr. 18, 1995, abandoned, which is a continuation of application No. 08/076,583, Jun. 14, 1993, abandoned.

[30] Foreign Application Priority Data

Jun. 19, 1992 [JP] Japan .................................... 4-185829

[51] Int. Cl.$^6$ ...................................................... G11B 5/02
[52] U.S. Cl. ................................................ 360/18; 386/65
[58] Field of Search ............................. 360/18, 19.1, 20, 360/27, 30, 14.3, 38.1, 72.2; 358/906; 386/50, 65; 369/48, 54

[56] References Cited

U.S. PATENT DOCUMENTS

| | | | |
|---|---|---|---|
| 4,360,843 | 11/1982 | Menezes et al. | 360/14.3 X |
| 4,799,111 | 1/1989 | Ito | 360/14.3 |
| 4,970,612 | 11/1990 | Renders et al. | 360/74.3 X |
| 5,233,438 | 8/1993 | Funahashi et al. | 360/19.1 X |
| 5,383,069 | 1/1995 | Morita et al. | 360/38.1 X |

*Primary Examiner*—Aristotelis M Psitos
*Assistant Examiner*—James L Habermehl
*Attorney, Agent, or Firm*—Robin, Blecker & Daley

[57] ABSTRACT

A rotary head type reproducing apparatus capable of displaying each data code indicative of date, time and frame number, without interruption even during reproduction from a recording track on which a recording is made with such data code absent. In the apparatus, a recording track having a data code signal recording area in which a search marker is recorded is scanned by a rotary head, and when the search marker is reproduced and outputted, the search marker is demodulated by a search marker demodulating circuit and, simultaneously, the output of a data interpolating circuit is selected at the input of a switch. Each time a variation point of an SWP (head switching pulse) is detected by an SWP detecting circuit, the data interpolating circuit increments the respective count values of a frame counter, a time counter and a date counter decoded from a data code, on the basis of a data code obtained immediately before the demodulation of the search marker, and outputs the result to a system control circuit. The system control circuit displays the respective count values on a display.

32 Claims, 9 Drawing Sheets

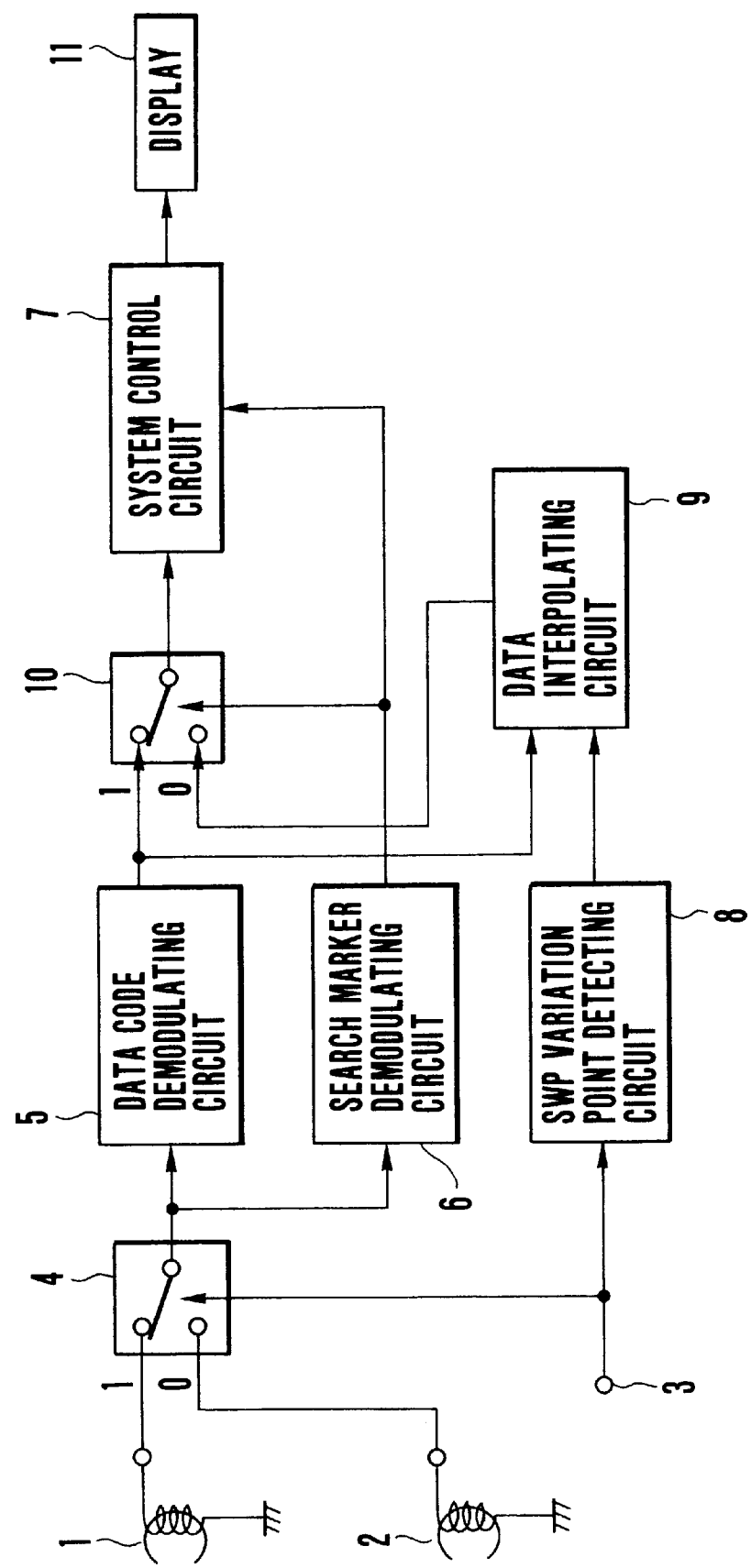

ROTARY HEAD REPRODUCING APPARATUS THAT DISPLAYS DATE, TIME, AND FRAME NUMBER EVEN WHEN SUCH DATA CODE INFORMATION IS ABSENT DURING A SEARCH MARKER USING INTERPOLATION BASED ON HEAD SWITCHING PULSE

This is a continuation application under 37 CFR 1.62 of prior application Ser. No. 08/425,229, filed Apr. 18, 1995, abn. which is a continuation of Ser. No. 08/076,583, filed Jun. 14, 1993, (abandoned).

BACKGROUND OF THE INVENTION

1. Field of the Invention

The present invention relates to a reproducing apparatus for reproducing a signal from a recording track having a data code recording area in which a data code indicative of date, time, frame number or the like or a search marker is recorded.

2. Description of the Related Art

It has heretofore been known that there is a VTR recording format according to which data codes indicative of date, time, frame number and the like and control information such as a search marker are recorded together with a video image and sound. On the basis of such a VTR recording format, there is also provided an arrangement which has, in addition to the function of recording and reproducing a video image and sound, various functions such as the function of displaying management information, such as date and time, and the function of performing a search operation.

FIG. 2 shows an example of an 8 mm VTR format. As can be seen from FIG. 2, a recording track TR, which is made up of a video and audio signal recording area "a", a PCM audio signal recording area "b" and a guard band area "c" provided therebetween, is formed on a magnetic tape TA, and data codes indicative of date, time, frame number and the like or a search marker is recorded in the guard band area "c".

FIG. 1 is a block diagram schematically showing the arrangement of a part for reproducing the data codes or the search marker in the conventional VTR.

The conventional VTR includes a rotary head 1 disposed at a location on the outer circumference of a rotary head drum, a rotary head 2 disposed at a location spaced 180° apart from the rotary head 1, a switch 4 for switching the rotary heads 1 and 2 therebetween in accordance with a head switching pulse (hereinafter referred to as "SWP") inputted from an SWP input terminal 3, a data code demodulating circuit 5, a search marker demodulating circuit 6, and a system control circuit 7 for providing control over the entire VTR apparatus.

The output side of the switch 4 is connected to each of the input sides of the data code demodulating circuit 5 and the search marker demodulating circuit 6. The output sides of the respective demodulating circuits 5 and 6 are connected to the input side of the system control circuit 7.

FIGS. 3(a) and 3(b) are schematic views respectively showing the waveforms of SWP trains and examples of different reproduction outputs from guard band areas on individual recording tracks in each of which a data code or a search marker is recorded. Parts 1) of FIGS. 3(a) and 3(b) respectively show the waveforms of the SWP trains, and Part 2) of FIG. 3(a) shows a reproduction output from guard band areas in which data codes A, B and C are individually recorded (for example, the data codes A, B and C indicate frame data, time data and date data, respectively), while part 3) of FIG. 3(b) shows a reproduction output from guard band areas in which the aforesaid data codes A, B and C as well as search markers D are individually recorded. The data codes A, B and C are recorded in the guard band areas on the respective recording tracks in that order, while the search markers D are continuously recorded in the guard band areas on a predetermined number of recording tracks.

The following explanation will be made in connection with a case where the recording tracks having the guard band areas shown in Part 3) of FIG. 3(b) are reproduced by the conventional VTR of FIG. 1.

When the recording tracks in a section 1 are scanned by the rotary heads 1 and 2, the data codes indicative of date, time, frame number and the like are demodulated by the data code demodulating circuit 5. On the basis of the demodulated data codes, the system control circuit 7 causes a display (not shown) to display the data codes indicative of date, time, frame number and the like.

Also, when the recording tracks in a section 2 are scanned by the rotary heads 1 and 2, search marker data is demodulated from the output signal of the switch 4 by the search marker demodulating circuit 6, and a search marker processing is executed by the system control circuit 7.

However, the above-described conventional VTR has a problem. For example, if the recording tracks having the guard band areas shown in Part 3) of FIG. 3(b) are reproduced, the data codes indicative of date, time, frame number and the like will be continuously displayed during scanning of the section 1 and a section 3. However, during scanning of the section 2, since the search markers are recorded in place of the data codes in the section 2, i.e., since the data codes are absent in the section 2, the display of the data such as date, time, frame number and the like is interrupted.

SUMMARY OF THE INVENTION

A first object of the present invention which has been made in the light of the above-described problem is to provide a recording and reproducing apparatus capable of recording each kind of control data or management data at a predetermined location in each recording track on a recording medium and capable of processing such control data or management data without interruption even during reproduction from a recording track in which the control data or the management data is absent.

A second object of the present invention is to provide a rotary head type reproducing apparatus capable of displaying each kind of data indicative of date, time, frame number and the like without interruption, even during reproduction from a recording track on which a recording is made with such kind of data absent.

To achieve the above objects, in accordance with one aspect of the present invention, there is provided a video signal recording and reproducing apparatus for reproducing a signal from a recording track having a data code recording area in which a predetermined data code or search marker is recorded, which apparatus is provided with interpolating means for interpolating an absent data code by generating a pseudo data code during reproduction from a recording track on which the search marker is recorded with the data code absent.

According to the above arrangement, if a recording track having a data code recording area in which a search marker is recorded with a data code absent is reproduced, it is possible to interpolate the absent data code on the basis of the previous data code by the interpolating means and reproduce the interpolated data code on a display.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a block diagram schematically showing the arrangement of a rotary head type reproducing apparatus according to a first embodiment of the present invention;

DETAILED DESCRIPTION OF THE PREFERRED EMBODIMENTS

Preferred embodiments of the present invention will be described below with reference to the accompanying drawings.

Figure 1:
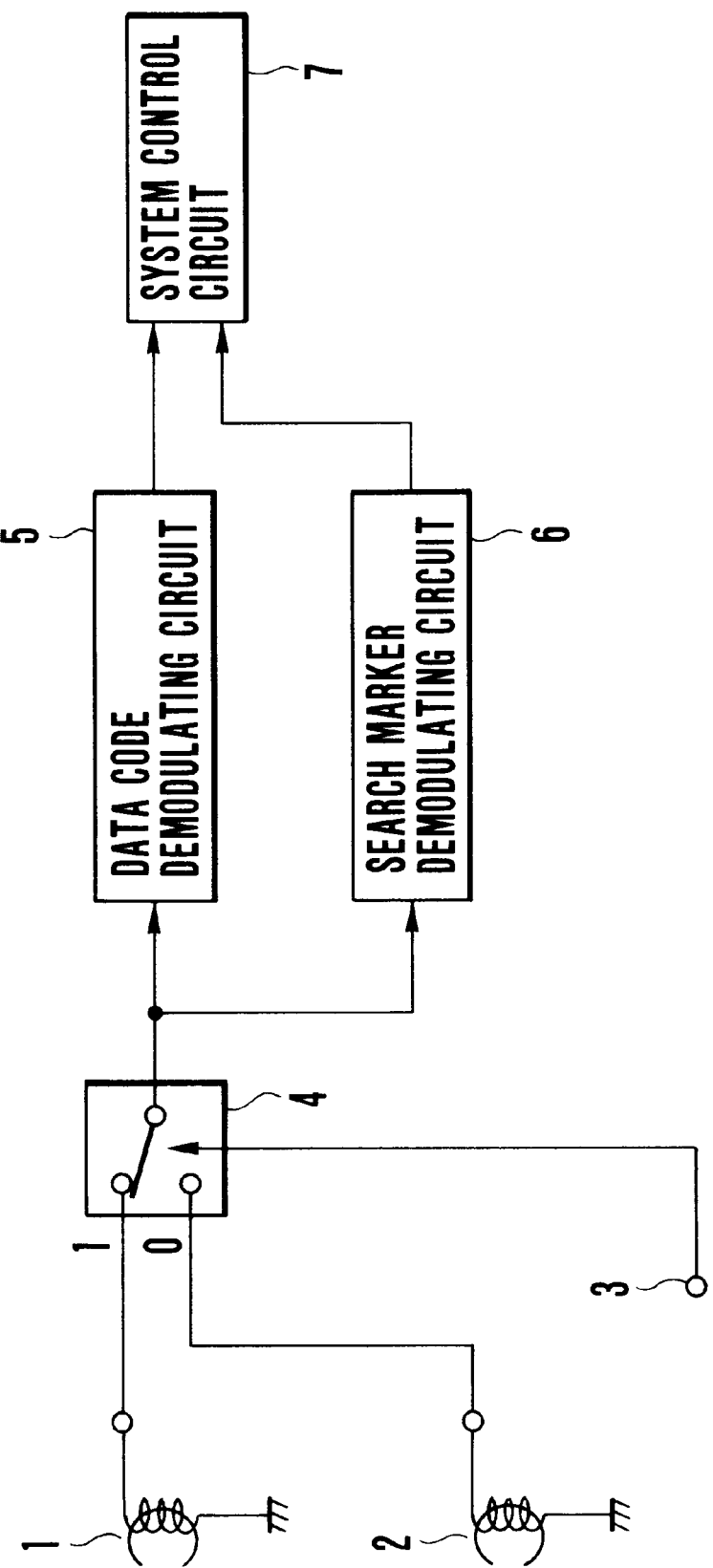
FIG. 1 is a block diagram schematically showing the arrangement of a conventional 8 mm type of VTR.
Figure 2:
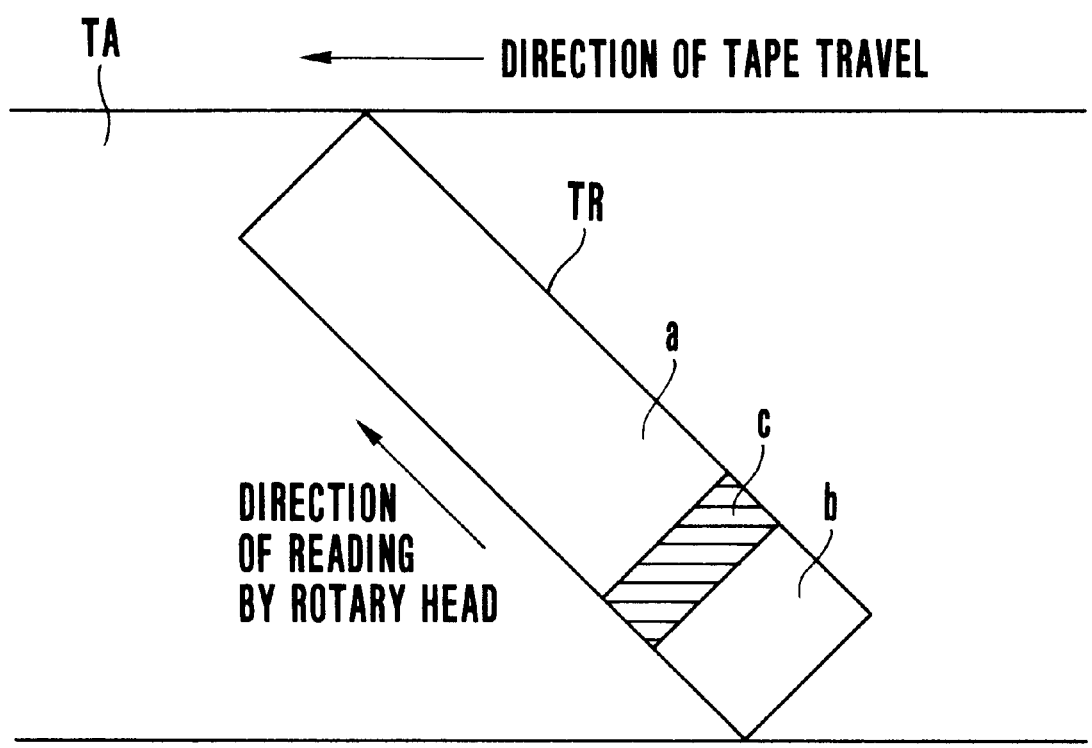
FIG. 2 is a schematic view which serves to explain a recording track recorded on a recording medium.

FIG. 4 is a block diagram schematically showing the arrangement of a rotary head type reproducing apparatus according to a first embodiment of the present invention. The first embodiment provides an arrangement in which the present invention is applied to an 8 mm type VTR, and in FIG. 4, the same reference numerals are used to denote elements corresponding to those shown in the block diagram of FIG. 1.

Similarly to the VTR described previously with reference to FIG. 1, the 8 mm type VTR according to the first embodiment includes rotary heads 1 and 2, an SWP input terminal 3, a switch 4, a data code demodulating circuit 5, a search marker demodulating circuit 6 and a system control circuit 7.

The first embodiment further includes an SWP variation point detecting circuit 8 for detecting a rise point or a fall point of an SWP, a data interpolating circuit 9 for interpolating absent data, a switch 10 for switching, when a search marker is demodulated from a recording track, its input from an output from the data code demodulating circuit 5 to an output from the data interpolating circuit 9, and a display 11 for displaying various control and management information including the demodulated data code information. The display 11 may be, for example, a monitor display screen, an electronic viewfinder in the case of a camera-integrated type VTR, or a liquid-crystal display provided in the apparatus.

The SWP is supplied to the input side of the SWP variation point detecting circuit 8 via the input terminal 3, and the output side of the SWP variation point detecting circuit 8 is connected to one input terminal of the data interpolating circuit 9. The output side of the data code demodulating circuit 5 is connected to the other input terminal of the data interpolating circuit 9. The output of the data code demodulating circuit 5, in addition to the output side of the data interpolating circuit 9, is connected to the input side of the switch 10. The output side of the switch 10 is connected to the input side of the system control circuit 7. The output side of the search marker demodulating circuit 6 is connected to a selecting input terminal of the switch 10, so that when a search marker is demodulated from a recording track which is being reproduced, an output from the data interpolating circuit 9 is selected as the input of the switch 10.

Figure 5:
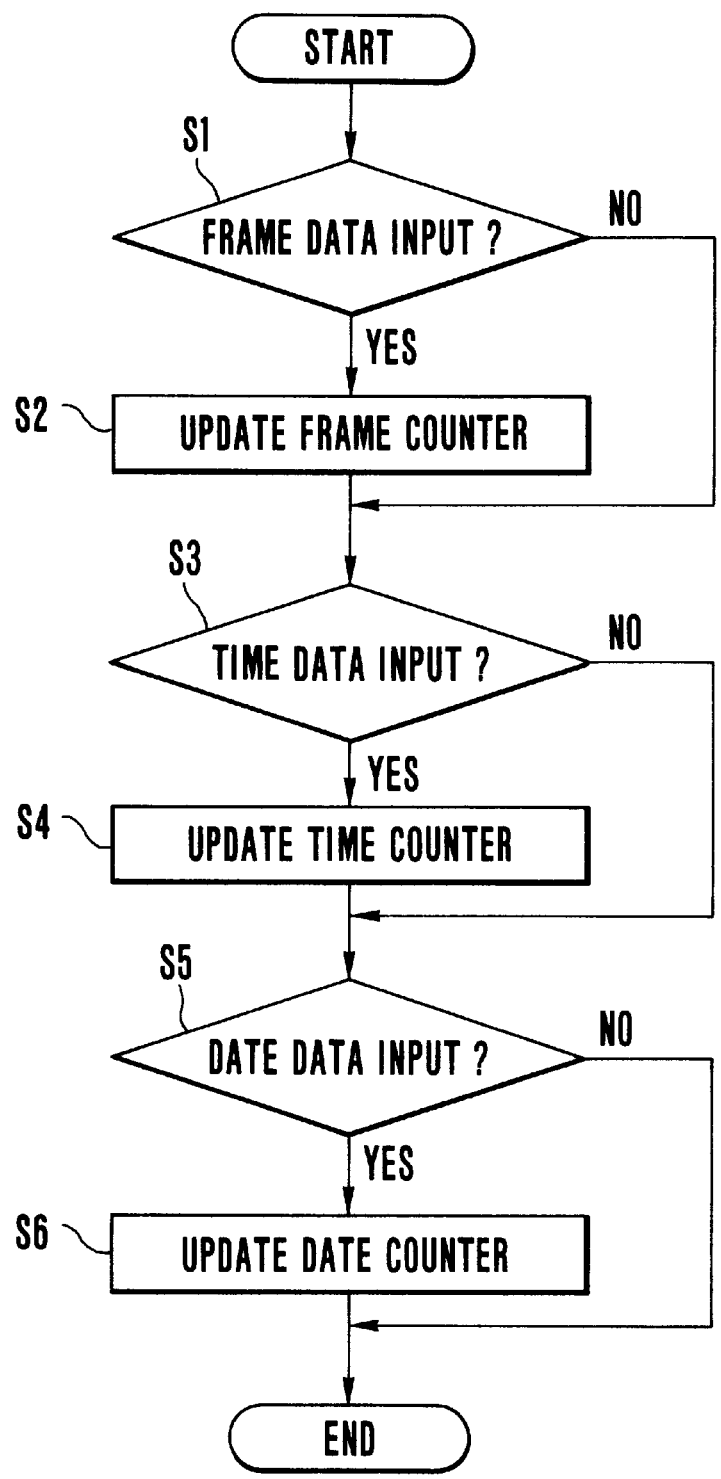
FIG. 5 is a flowchart showing the operation of a data interpolating circuit used in the first embodiment.
Figure 6:
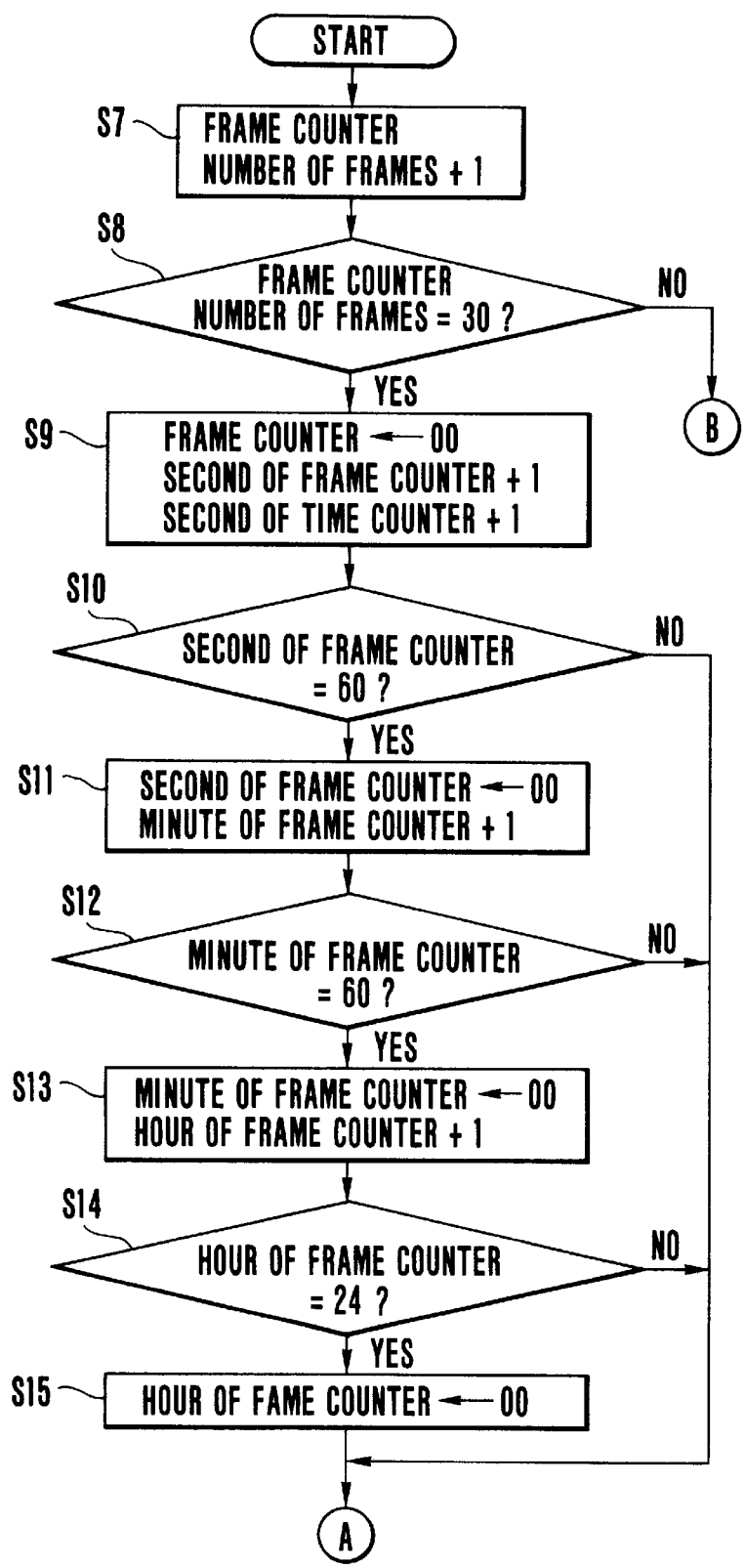
FIG. 6 is a flowchart showing the operation of the data interpolating circuit used in the first embodiment.
Figure 7:
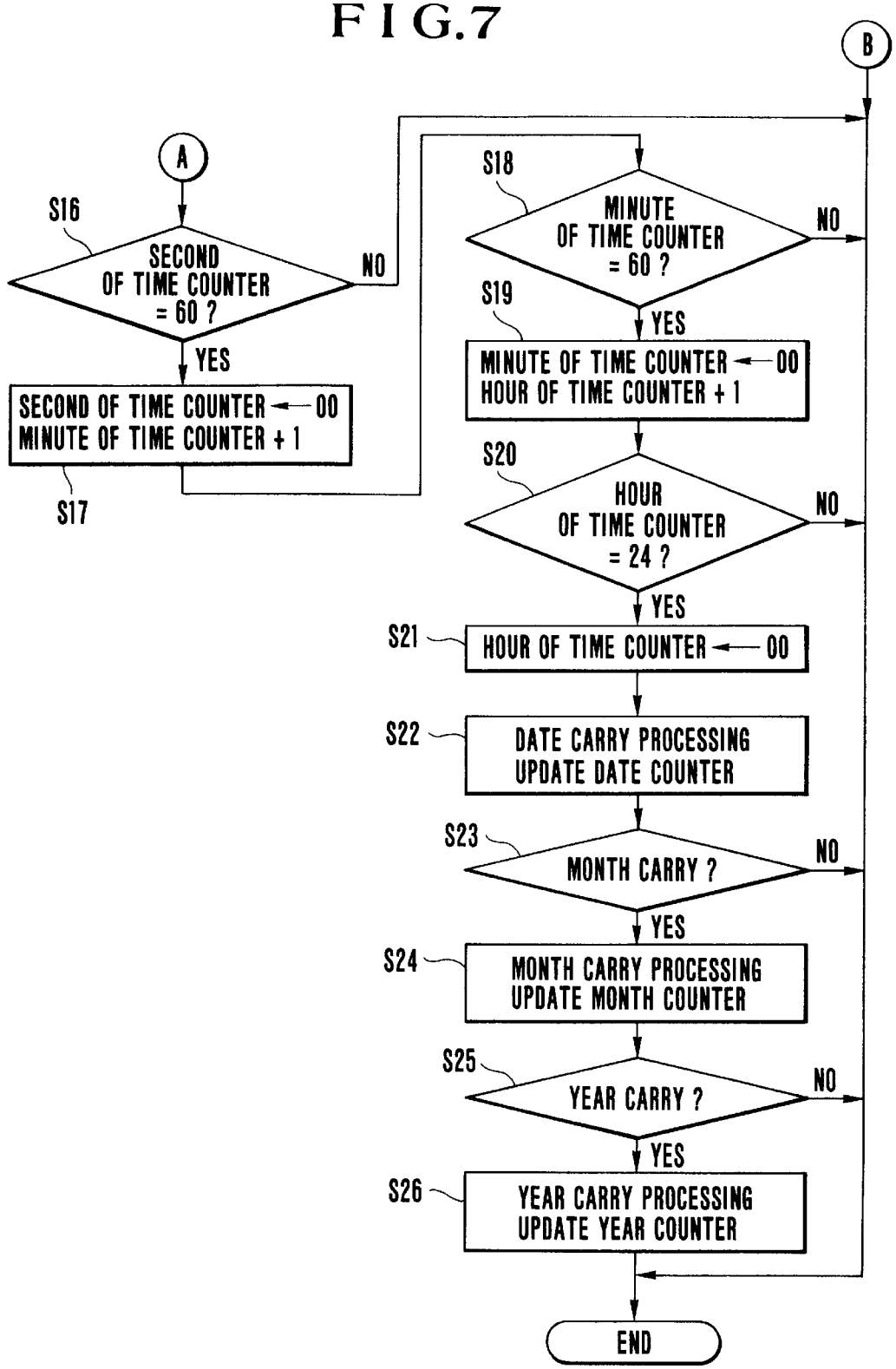
FIG. 7 is a flowchart showing the operation of the data interpolating circuit used in the first embodiment.

When the rise point or the fall point of the SWP is detected by the SWP variation point detecting circuit 8, the data interpolating circuit 9 executes any of the processes shown in the flowcharts of FIGS. 5 through 7 in accordance with an output from the data code demodulating circuit 5.

Specifically, if a data code is outputted from the data code demodulating circuit 5 when a variation point of the SWP is detected, updating of a frame counter, a time counter and a date counter is performed on the basis of the demodulated data code, as shown in the flowchart of FIG. 5. If a data code is not outputted from the data code demodulating circuit 5 when the variation point of the SWP is detected, i.e., if a search marker is outputted from the search marker demodulating circuit 6, the frame counter, the time counter and the date counter are each incremented on the basis of the flowcharts of FIGS. 6 and 7.

Figure 3A:
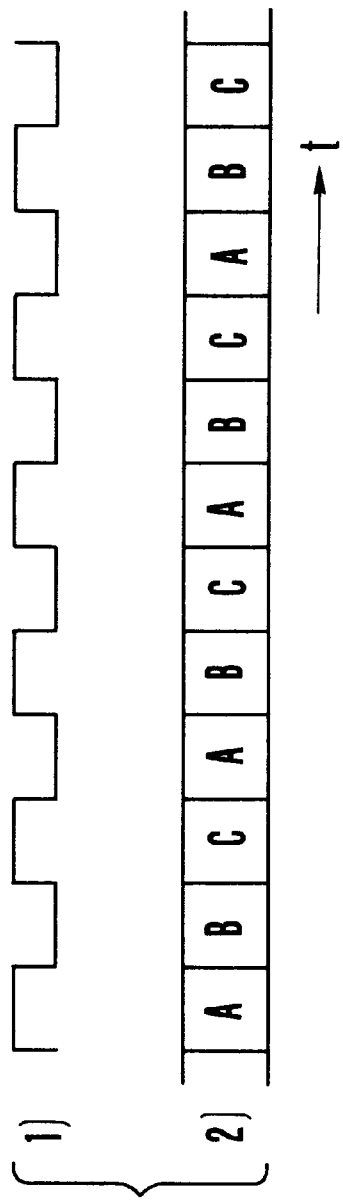
FIGS. 3(a) and 3(b) are explanatory views each of which schematically shows a train of head switching pulses and a different example of a reproduction output from a guard band area.
Figure 3B:
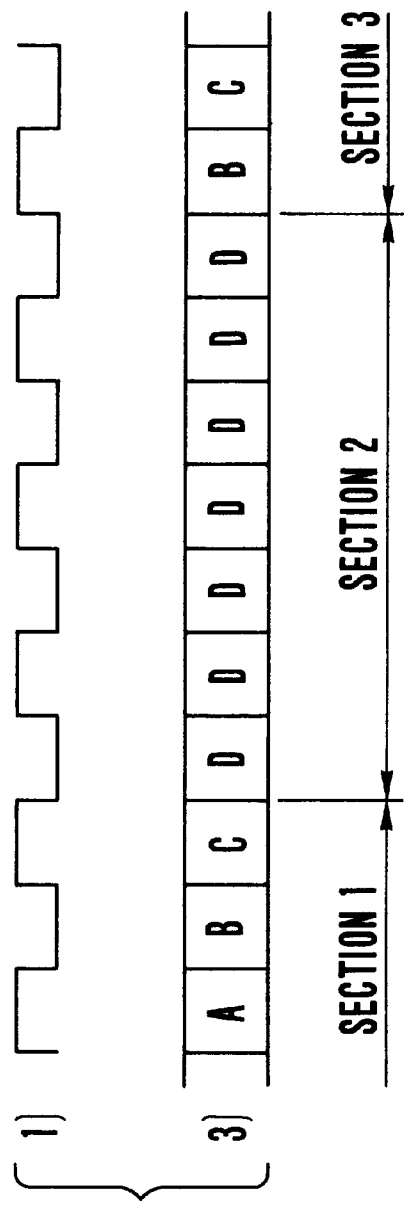

The operation of the data interpolating circuit 9 when the reproduction output of the guard band area shown in FIG. 3(b) is obtained in the VTR according to the first embodiment will be described in detail below with reference to the flowcharts shown in FIGS. 5 through 7.

Referring to FIG. 3(b), when a first recording track in a section 1 is scanned and a data code (frame data) A is reproduced and outputted, the frame data A is demodulated by the data code demodulating circuit 5.

More specifically, referring to FIG. 5, it is determined in Step S1 whether the frame data A has been inputted. In this case, since the frame data A is inputted, the process proceeds to Step S2 and the value of the frame counter is updated. Then, in Step S3, it is determined whether time data B has been inputted. In this case, since the time data B is not inputted, the process proceeds to Step S5. Then, it is determined in Step S5 whether date data C has been inputted, and similar processing is executed and the process comes to an end.

Then, when a second recording track in the section 1 is scanned and a data code (time data) B is reproduced and outputted, the process proceeds from Step S1 to Step S3, in which it is determined whether the time data B has been inputted. In this case, since the time data B is inputted, the value of the time counter is updated in Step S4, and the process proceeds to Step S5. After the decision in Step S5 has been made, the process comes to an end.

When a third recording track in the section 1 is scanned and a data code (date code) C is reproduced and outputted, the process proceeds from Step S1 to Step S5 through Step S3, and in Step S5, it is determined whether the date code C has been inputted. In this case, since the date code C is inputted, the process proceeds to Step S6, in which the value of the date counter is updated. Then, the process comes to an end.

Then, when a first recording track in a section 2 is scanned and a search marker D is reproduced and outputted, the search marker D is demodulated by and outputted from the search marker demodulating circuit 6. Accordingly, each time the state of the SWP varies, the data interpolating circuit 9 increments each of the frame counter, the time counter and the date counter in accordance with the flowcharts shown in FIGS. 6 and 7 on the basis of the count values of the respective counters which were updated on the basis of the last track in the section 1.

First, if the state of the SWP varies and a new recording track is scanned, the count value of the frame counter, i.e., the number of frames, is incremented by "1" in Step S7 of FIG. 6. Incidentally, the frame counter is a counter having the function of counting hour, minute, second and the number of frames, and 30 frames correspond to 1 second.

Then, in Step S8, it is determined whether the number of frames is "30", and if it is determined that the number of frames is not "30", the process comes to an end. If it is determined that the number of frames is "30", the number of frames is reset to "0" in Step S9 and the second of the frame counter and the second of the time counter are both incremented by "1".

In Steps S10 to S15, a carry processing is performed on the hour and the minute of the frame counter, and in Steps S16 to S21, a carry processing is performed on the hour and the minute of the time counter. If a carry occurs in the hour of the time counter, a carry processing is performed on the year, the month and the day of the date counter in Steps S22 to S26. Thus, a series of processings is completed.

Subsequently, when each track in the section 3 is scanned, the data interpolating circuit 9 executes processing identical to the above-described processings executed during the scanning of the section 1.

In the above-described manner, the data interpolating circuit 9 at all times performs updating of the frame counter, the time counter and the date counter. If the search marker D is detected by the search marker demodulating circuit 6, the switch 10 selects the output of the data interpolating circuit 9 as its input, so that each of the interpolated counter values is displayed on the display 11 by the system control circuit 7. On the other hand, while the data codes A, B and C are being outputted from the data code demodulating circuit 7, the data codes A, B and C are displayed on the display 11 by the system control circuit 7. Accordingly, it is possible to continuously display each of the count values irrespective of whether any of the data codes A, B and C to be recorded in an information track (the data code recording area on the recording track) is absent due to the recording of the search marker D.

Figure 8:
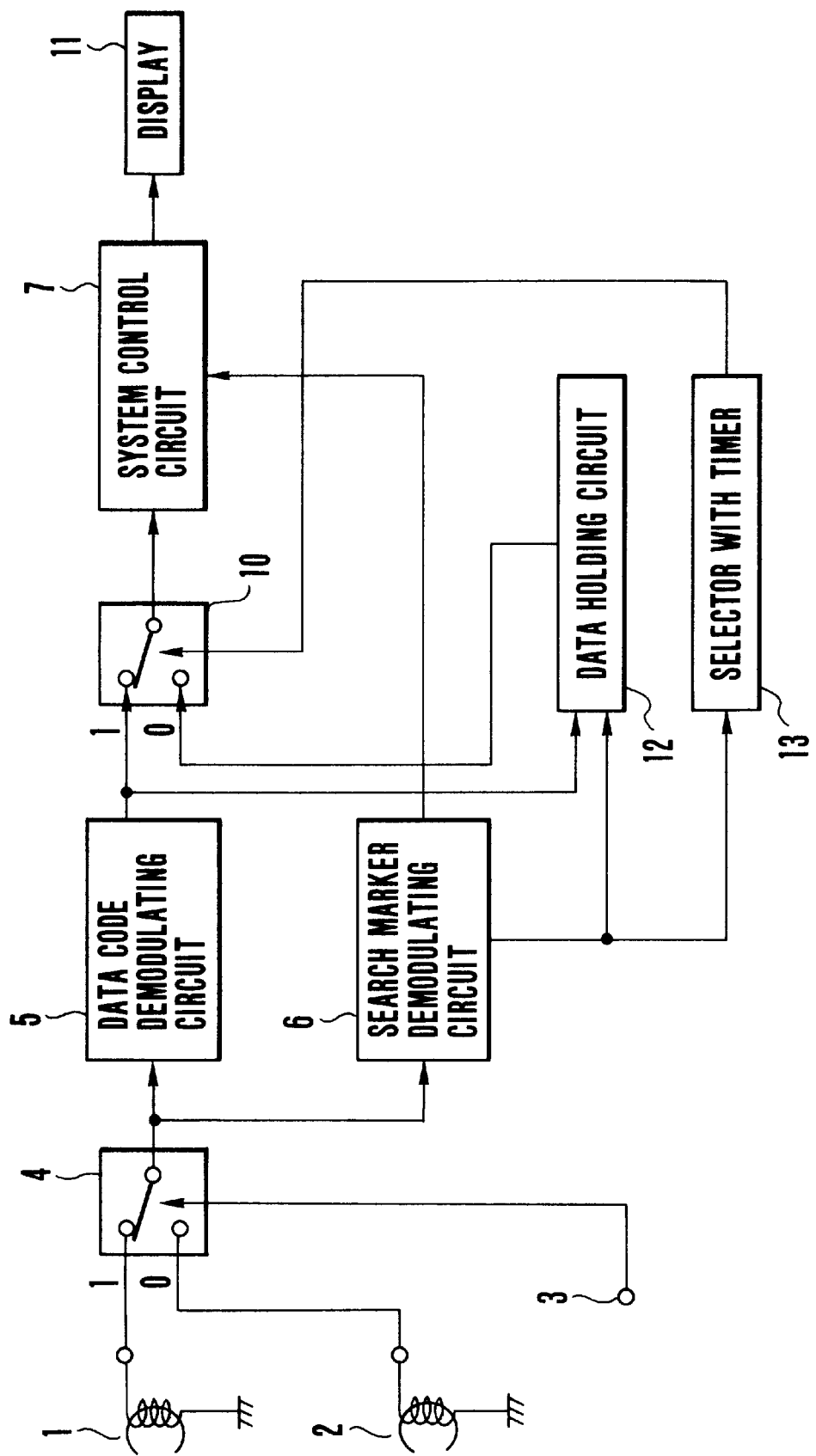
FIG. 8 is a block diagram schematically showing the arrangement of a rotary head type reproducing apparatus according to a second embodiment of the present invention.

FIG. 8 is a block diagram schematically showing the arrangement of a rotary head type reproducing apparatus according to a second embodiment of the present invention.

The second embodiment differs from the above-described first embodiment in that a data holding circuit 12 and a selector 13 with a timer are employed in place of the SWP variation point detecting circuit 8 and the data interpolating circuit 9. In FIG. 8, the same reference numerals are used to denote elements corresponding to those shown in FIG. 4, and description thereof is omitted.

Similarly to the first embodiment shown in FIG. 4 referred to above, the second embodiment includes the rotary heads 1 and 2, the SWP input terminal 3, the switch 4, the data code demodulating circuit 5, the search marker demodulating circuit 6, the system control circuit 7, the switch 10 and the display 11.

The second embodiment further includes the data holding circuit 12 for latching, if a search marker is demodulated by the search marker demodulating circuit 6, a data code demodulated by the data code demodulating circuit 5 immediately before the demodulation of the search marker and outputting the latched data code, as well as the selector 13 with the timer, which starts counting at the first time that a search marker is detected and, when a predetermined time T elapses, causes the switch 10 to select the output of the data code demodulating circuit 5 as the input.

The input side of the data holding circuit 12 is connected to each of the output sides of the data code demodulating circuit 5 and the search marker demodulating circuit 6. The output side of the data holding circuit 12 is connected to one input terminal of the switch 10.

The input side of the selector 13 with the timer is connected to the output side of the search marker demodulating circuit 6, and the output side of the timer 13 with the timer is connected to the selecting input terminal of the switch 10.

The operation of the apparatus having the above described arrangement will be described in detail below with reference to a case in which the reproduction output of the guard band area shown in FIG. 3(b) is obtained.

When the rotary heads 1 and 2 sequentially scan the recording tracks in the section 1, the corresponding data codes demodulated by the data code demodulating circuit 5 are outputted, and the respective values of the frame counter, the time counter and the date counter are displayed on the display 11. Incidentally, during the scanning of the recording tracks in the section 1, since no search marker is reproduced nor outputted, the timer of the selector 13 with the timer is reset.

Then, when the rotary heads 1 and 2 scan a first recording track in the section 2, the search marker demodulated by the search marker demodulating circuit 6 is outputted and, at the same time, the previous data code (i.e., the data code reproduced from the last recording track in the section 1) is latched by the data holding circuit 12 and the timer of the selector 13 with the timer starts its counting. Simultaneously, the selector 13 with the timer switches the input of the switch 10 from the output from the data code demodulating circuit 5 to the output from the data holding circuit 12, and the system control circuit 7 displays each of the counter values based on the aforesaid latched data code on the display 11.

After the passage of the predetermined time T which elapses from the start until the end of the scanning of the recording tracks in the section 2 on which the respective search markers are recorded, i.e., when the scanning proceeds to a first recording track in a section 3, the selector 13 with the timer switches the input of the switch 10 from the output of the data holding circuit 12 to the output of the data code demodulating circuit 5.

In the above-described manner, when the rotary heads 1 and 2 scan the recording tracks in the section 3, the input of the switch 10 is switched from the output of the data holding circuit 12 to the output of the data code demodulating circuit 5 by the selector 13 with the timer, and the respective counter values based on the data codes reproduced from the recording tracks in the section 3 are displayed on the display 11.

In the above-described manner, it is possible to display the respective counter values without interruption similarly to the first embodiment.

As is apparent from the above description, according to the first and second embodiments, in a reproducing apparatus for reproducing a signal from a recording track having a data code recording area in which a predetermined data code or search marker is recorded, there is provided interpolating means for interpolating an absent data code by generating a pseudo data code during reproduction from a recording track on which a search marker is recorded with a data code absent. Accordingly, even during reproduction from a recording track on which a recording is made with data codes indicative of date, time and frame number being absent, it is possible to display the respective data codes without interruption.

Figure 9:
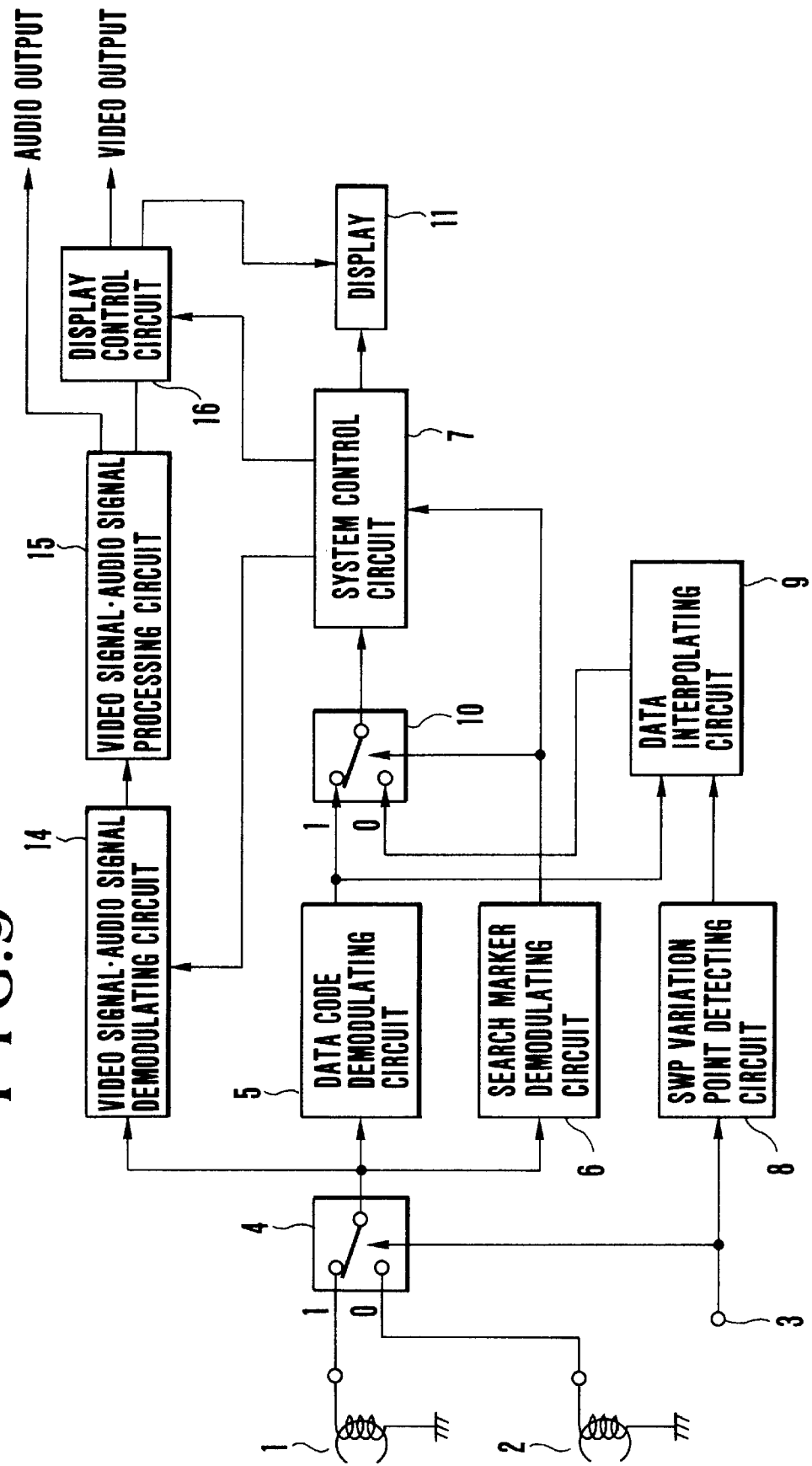
FIG. 9 is a block diagram showing an example in which a video•signal audio signal processing system is added to the arrangement of the first embodiment shown in FIG. 4.

FIG. 9 is a block diagram of an example in which a video signal•audio signal reproduction processing system is added to the arrangement of the first embodiment shown in FIG. 4. In the example shown in FIG. 9, reference will be made to a camera-integrated type VTR for the purpose of illustation only. In FIG. 9, the same reference numerals are used to denote constituent elements corresponding to those shown in FIG. 4.

The arrangement shown in FIG. 9 includes the display 11 such as an electronic viewfinder, a video signal•audio signal demodulating circuit 14 for demodulating a video signal and an audio signal which are reproduced from a recording track on a recording medium, a video signal•audio signal processing circuit 15 for applying a predetermined processing to the video signal and the audio signal outputted from the video signal•audio signal demodulating circuit 14 to convert the video signal into a format which can be displayed on an external monitor or the like and to convert the audio signal into an audio output which can be reproduced, and a display control circuit 16 for outputting, to the display 11 such as an electronic viewfinder, only the video signal outputted from the video signal•audio signal processing circuit 15 or the video signal as well as a demodulated data code superimposed thereon. According to the above-described arrangement, it is possible for a user to visually confirm a video image and the content of the data code by means of the electronic viewfinder.

Since the operations of the other elements are substantially the same as those described in connection with the first embodiment, description thereof is omitted.

What is claimed is:

1. A reproduction apparatus which employs a recording medium of a type in which main information and sub-information containing predetermined management information can be recorded on a recording track, comprising:
  A) reproducing means for reproducing the main information and the sub-information from the recording track;
  B) demodulating means for demodulating the main information and the sub-information reproduced by said reproducing means;
  C) discriminating means for discriminating the types of the sub-information demodulated by said demodulating means;
  D) memory means for storing the sub-information;
  E) selecting means for selecting an output of said demodulating means in the state that first type of the sub-information is discriminated or an output of said memory means in the state that second type of the sub-information is discriminated by said discriminating means; and
  F) control means for controlling said apparatus to operate differentially according to the type of the sub-information.

2. A reproducing apparatus according to claim 1, further comprising display means for displaying the sub-information.

3. A reproducing apparatus according to claim 2, wherein said display means is capable of displaying the main-information and the sub-information.

4. A reproducing apparatus according to claim 1, wherein the recording medium is a magnetic tape, the recording track including a main-information area in which the main-information is recorded and a sub-information area in which the sub-information is recorded.

5. A reproducing apparatus according to claim 4, wherein the main-information is divided into two areas and the sub-information is formed in a guard band area between the two main-information areas.

6. A reproducing apparatus according to claim 1 or 5, wherein the sub-information includes either one of a data code and a search marker, the data code being indicative of date, time, frame number.

7. A reproducing apparatus according to claim 6, wherein said discriminating means makes a discriminating decision as to whether the sub-information includes the data code or the search marker, said memory means memorizes the data code, and said selecting means outputs, if a result of the discriminating decision indicates that the sub-information includes the search marker, a previous data code memorized in said memory means.

8. A reproducing apparatus according to claim 1, wherein said reproducing means includes a plurality of heads which are switched at intervals of a predetermined period.

9. A reproducing apparatus according to claim 8, wherein a timing at which said discriminating means discriminates between the types of the sub-information is synchronized with a timing at which said plurality of heads are switched.

10. A reproducing apparatus according to claim 1, wherein the main information includes video data.

11. A reproducing apparatus according to claim 1, wherein the main information includes audio data.

12. A video tape recorder capable of recording a plurality of kinds of sub-information signals together with a main information signal including a video signal on a tape-shaped recording medium, comprising:
  A) reproducing means for reproducing the main information signal and the sub-information signal from a recording track on the recording medium by a same head;
  B) demodulating means for demodulating the main information signal and the sub-information signal reproduced by said reproducing means;
  C) memory means for storing the sub-information signal demodulated by said demodulating means;
  D) display means for displaying the sub-information signal;
  E) discriminating means for discriminating the kinds of the sub-information signals demodulated by said demodulating means; and
  F) control means for controlling the display means to display an output of the reproducing means if first kind of information is discriminated or to display an output of the memory means, if second kind of information is discriminated.

13. A video tape recorder according to claim 12, wherein the sub-information signal includes a data code or a search marker, the data code being indicative of date, time, frame number.

14. A video tape recorder according to claim 13, wherein said control means controls said display means to display the data code if the data code is discriminated or outputs the previous data code without modification, if the search marker is discriminated.

15. A video tape recorder according to claim 13, wherein said control means controls said display means to display the data code if the data code is discriminated, or outputs pseudo information computed on the basis of the previous data code to said display means, if the search marker is discriminated.

16. A video tape recorder according to claim 15, wherein said reproducing means operates in such a manner as to selectively switch a plurality of heads disposed around an outer circumference of a rotary head drum in response to a head switching pulse of predetermined period, and said control means controls said display means to display the data code, if the data code is discriminated, or forms the pseudo information by updating the previous data code in response to the head switching pulse if the search marker is discriminated.

17. A video tape recorder according to claim 12, wherein the recording medium is subjected to recording on the basis of an 8 mm VTR format.

18. A reproduction apparatus for reproducing a recording medium of a type in which main information and sub-information containing predetermined management information can be recorded on a recording area, comprising:

A) reproducing means for reproducing the main information and the sub-information from the recording area;

B) discriminating means for discriminating the types of the sub-information reproduced by said reproducing means;

C) memory means for storing the sub-information;

D) selecting means for selecting an output of said reproducing means in the state that first type of the sub-information is discriminated or an output of said memory means in the state that second type of the sub-information is discriminated by said discriminating means; and F) control means for controlling said apparatus to operate differentially according to the type of the sub-information.

19. A reproducing apparatus according to claim 18, further comprising display means for displaying the sub-information.

20. A reproducing apparatus according to claim 18, wherein said display means is capable of displaying the main-information and the sub-information.

21. A reproducing apparatus according to claim 18, wherein the recording area including a main-information area in which the main-information is recorded and a sub-information area in which the sub-information is recorded.

22. A reproducing apparatus according to claim 21, wherein the main-information area is divided into a plurality of areas and the sub-information is formed in an area except the two main-information areas.

23. A reproducing apparatus according to claim 18, wherein the sub-information includes either one of a data code and a search marker.

24. A reproduction apparatus for reproducing a recording medium of a type in which main information and sub-information can be recorded on a recording area, comprising:

A) reproducing means for reproducing the sub-information from the recording area;

B) discriminating means for discriminating the type of the sub-information reproduced by said reproducing means;

C) memory for storing data based on the sub-information;

D) selecting means for selecting an output of said reproducing means in the state that first type of the sub-information is discriminated or an output of said memory means in the state that second type of the sub-information is discriminated by said discriminating means; and E) control means for controlling said apparatus to operate differentially according to the type of the sub-information.

25. A reproducing apparatus according to claim 24, further comprising display means of displaying the sub-information.

26. A reproducin apparatus according to claim 25, wherein said display means is capable of displaying the main information and the sub-information.

27. A reproducin apparatus according to claim 24, wherein the recording area including a main-information area in which the main-information is recorded and a sub-information area in which the sub-information is recorded.

28. A reproducin apparatus according to claim 27, wherein the main-information area is divided into a plurality of areas and the sub-information area is formed in an area except the two main-information areas.

29. A reproducin apparatus according to claim 24, wherein the sub-information includes either one of a data code and a search marker.

30. A reproducin apparatus according to claim 24, wherein the sub-information is a magnetic information and said memory means stores electric data converted from the magnetic information.

31. A reproducin apparatus according to claim 24, wherein the sub-information is an information of time.

32. A reproducin apparatus according to claim 24, wherein the sub-information is an information of data.

* * * * *

UNITED STATES PATENT AND TRADEMARK OFFICE
CERTIFICATE OF CORRECTION

PATENT NO.    : 6,002,537
DATED         : December 14, 1999
INVENTOR(S)   : Keiji Satoh Page 1 of 1

It is certified that error appears in the above-identified patent and that said Letters Patent is hereby corrected as shown below:

Column 3:
Line 35, delete "video signal audio" and insert --video signal audio--.

Column 10:
Line 30, delete "reproducin" and insert --reproducing--.
Line 33, delete "reproducin" and insert --reproducing--.
Line 38, delete "reproducin" and insert --reproducing--.
Line 42, delete "reproducin" and insert --reproducing--.
Line 45, delete "reproducin" and insert --reproducing--.
Line 49, delete "reproducin" and insert --reproducing--.
Line 51, delete "reproducin" and insert --reproducing--.
Line 52, delete "data" and insert -date-.

Signed and Sealed this

Twelfth Day of June, 2001

*Attest:*

*Attesting Officer*

NICHOLAS P. GODICI
*Acting Director of the United States Patent and Trademark Office*